(12) United States Patent
Ho et al.

(10) Patent No.: US 12,555,367 B2
(45) Date of Patent: Feb. 17, 2026

(54) GENERATING VIDEOS USING DIFFUSION MODELS

(71) Applicant: Google LLC, Mountain View, CA (US)

(72) Inventors: Jonathan Ho, New York, NY (US); Tim Salimans, Utrecht (NL); Alexey Alexeevich Gritsenko, Amsterdam (NL); William Chan, Toronto (CA); Mohammad Norouzi, Richmond Hill (CA); David James Fleet, Toronto (CA)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 18/296,938

(22) Filed: Apr. 6, 2023

(65) Prior Publication Data

US 2024/0338936 A1   Oct. 10, 2024

(51) Int. Cl.
*G06V 10/82* (2022.01)
*G06V 10/771* (2022.01)
*H04N 7/01* (2006.01)

(52) U.S. Cl.
CPC ............ *G06V 10/82* (2022.01); *G06V 10/771* (2022.01); *H04N 7/0117* (2013.01); *H04N 7/013* (2013.01)

(58) Field of Classification Search
None
See application file for complete search history.

(56) References Cited

U.S. PATENT DOCUMENTS

| 11,908,180 | B1 * | 2/2024 | Ho | G06T 3/4053 |
| 12,299,774 | B2 * | 5/2025 | Green | G10L 15/1807 |
| 2023/0230198 | A1 * | 7/2023 | Zhang | G06N 3/08 |
| | | | | 382/276 |
| 2025/0139959 | A1 * | 5/2025 | Chen | G06V 10/774 |

OTHER PUBLICATIONS

Diffusion Video Autoencoders: Toward Temporally Consistent Face Video Editing via Disentangled Video Encoding Gyeongman Kim (Year: 2022).*
Imagen Video: High Definition Video Generation With Diffusion Models Jonathan Ho , (Year: 2022).*

(Continued)

*Primary Examiner* — Nancy Bitar
(74) *Attorney, Agent, or Firm* — Fish & Richardson P.C.

(57) ABSTRACT

Methods, systems, and apparatus, including computer programs encoded on computer storage media, for generating an output video conditioned on an input. In one aspect, a method comprises receiving the input; initializing a current intermediate representation; generating an output video by updating the current intermediate representation at each of a plurality of iterations, wherein the updating comprises, at each iteration: processing an intermediate input for the iteration comprising the current intermediate representation using a diffusion model that is configured to process the intermediate input to generate a noise output; and updating the current intermediate representation using the noise output for the iteration.

20 Claims, 6 Drawing Sheets

(56) References Cited

OTHER PUBLICATIONS

[No Author Listed] [online], "TensorFlow Datasets: a collection of ready-to-use datasets," available on or before Dec. 25, 2022, via Internet Archive: Wayback Machine URL <https://web.archive.org/web/20221225190859/https://www.tensorflow.org/datasets>, retrieved on Mar. 5, 2024, URL<https://www.tensorflow.org/datasets>, 2 pages.
Arnab et al., "ViViT: A Video Vision Transformer," Proceedings of the 2021 IEEE/CVF International Conference on Computer Vision (ICCV), Oct. 10-17, 2021, pp. 6836-6846.
Babaeizadeh et al., "FitVid: Overfitting in pixel-level video prediction," CoRR, submitted on Jun. 24, 2021, arXiv:2106.13195v1, 25 pages.
Babaeizadeh et al., "Stochastic variational video prediction," CoRR, submitted on Oct. 30, 2017, arXiv:1710.11252v1, 12 pages.
Bertasius et al., "Is space-time attention all you need for video understanding?" CoRR, submitted on Jun. 9, 2021, arXiv:2102.05095v4, 13 pages.
Chen et al., "PixelSNAIL: An improved autoregressive generative model," Proceedings of the 35th International Conference on Machine Learning (PMLR), Jul. 3, 2018, 80:864-872.
Chen et al., "WaveGrad: Estimating gradients for waveform generation," International Conference on Learning Representations, Oct. 2, 2021, 15 pages.
Çiçek et al., "3D U-Net: learning dense volumetric segmentation from sparse annotation," Proceedings of Medical Image Computing and Computer-Assisted Intervention (MICCAI 2016), Oct. 17-21, 2016, pp. 424-432.
Clark et al., "Adversarial video generation on complex datasets," CoRR, submitted on Sep. 25, 2019, arXiv:1907.06571v2, 21 pages.
Devlin et al., "BERT: Pre-training of deep bidirectional transformers for language understanding," Proceedings of the 2019 Conference of the North American Chapter of the Association for Computational Linguistics: Human Language Technologies (NAACL-HLT), Jun. 2019, pp. 4171-4186.
Dhariwal et al., "Diffusion models beat GANs on image synthesis," Proceedings of Advances in neural information processing systems, Dec. 6, 2021, 34:8780-8794.
github.io [online], "Video Diffusion Models," available on or before Mar. 8, 2024, via Internet Archive: Wayback Machine URL <https://web.archive.org/web/20240308145935/https://video-diffusion.github.io/>, retrieved on Mar. 14, 2024, URL<https://video-diffusion.github.io/>, 4 pages.
Gordon et al., "Latent neural differential equations for video generation," Proceedings of NeurIPS 2020 Workshop on Pre-registration in Machine Learning (PMLR), Jul. 8, 2021, pp. 73-86.
Ho et al., "Axial attention in multidimensional transformers," CoRR, submitted on Dec. 20, 2019, arXiv:1912.12180v1, 11 pages.
Ho et al., "Cascaded diffusion models for high fidelity image generation, " CoRR, submitted on Dec. 17, 2021, arXiv:2106.15282v3, 33 pages.
Ho et al., "Classifier-free diffusion guidance," Proceedings of NeurIPS 2021 Workshop on Deep Generative Models and Downstream Applications, Dec. 8, 2021, 8 pages.
Ho et al., "Denoising diffusion probabilistic models," Proceedings of the 34th International Conference on Neural Information Processing Systems, Dec. 2020, pp. 6840-6851.
Kahembwe et al., "Lower dimensional kernels for video discriminators," Neural Networks, Dec. 2020, 132:506-520.
Kingma et al., "Variational diffusion models," CoRR, submitted on Jul. 12, 2021, arXiv:2107.00630v2, 24 pages.
Kong et al., "DiffWave: A versatile diffusion model for audio synthesis," Proceedings of 9th International Conference on Learning Representations, Jan. 2021, 17 pages.
Kumar et al., "VideoFlow: A flow-based generative model for video," CoRR, submitted on Jun. 10, 2019, arXiv:1903.01434v2, 13 pages.
Lee et al., "Stochastic adversarial video prediction," CoRR, submitted on Apr. 4, 2018, arXiv:1804.01523v1, 26 pages.
Menick et al., "Generating high fidelity images with subscale pixel networks and multidimensional upscaling," Proceeding of International Conference on Learning Representations, Dec. 2018, 15 pages.
Nichol et al., "GLIDE: Towards photorealistic image generation and editing with text-guided diffusion models," CoRR, submitted on Dec. 22, 2021, arXiv:2112.10741v2, 20 pages.
Nichol et al., "Improved denoising diffusion probabilistic models," Proceedings of International Conference on Machine Learning (PMLR), Jul. 1, 2021, pp. 8162-8171.
Ronneberger et al., "U-Net: Convolutional networks for biomedical image segmentation," Proceedings of International Conference on Medical Image Computing and Computer-Assisted Intervention, Nov. 2015, pp. 234-241.
Saharia et al., "Image super-resolution via iterative refinement," CoRR, submitted on Jun. 30, 2021, arXiv:2104.07636v2, 28 pages.
Saharia et al., "Palette: Image-to-image diffusion models," CoRR, submitted on Nov. 10, 2021, arXiv:2111.05826v1, 27 pages.
Saito et al., "Temporal Generative Adversarial Nets v2," Aug. 2020, retrieved on Mar. 14, 2024, retrieved from URL<https://github.com/pfnet-research/tgan2>, 8 pages.
Saito et al., "Train sparsely, generate densely: Memory-efficient unsupervised training of high-resolution temporal GAN," CoRR, submitted on Jun. 1, 2020, arXiv:1811.09245v2, 22 pages.
Salimans et al., "PixelCNN++: Improving the PixelCNN with discretized logistic mixture likelihood and other modifications," Proceedings of International Conference on Learning Representations, Apr. 2017, 10 pages.
Salimans et al., "Progressive distillation for fast sampling of diffusion models," Proceedings of International Conference on Learning Representations, Apr. 2022, 21 pages.
Shaw et al., "Self-attention with relative position representations," CoRR, submitted on Apr. 12, 2018, arXiv:1803.02155v2, 5 pages.
Sohl-Dickstein et al., "Deep unsupervised learning using nonequilibrium thermodynamics," Proceedings of the 32nd International Conference on Machine Learning (PMLR), Jun. 1, 2015, pp. 2256-2265.
Song et al., "Denoising diffusion implicit models," Proceedings of International Conference on Learning Representations, May 2021, 20 pages.
Song et al., "Generative modeling by estimating gradients of the data distribution," Proceedings of the 33rd International Conference on Neural Information Processing Systems, Dec. 2019, pp. 11895-11907.
Song et al., "Score-based generative modeling through stochastic differential equations," Proceedings of International Conference on Learning Representations, May 2021, 36 pages.
Soomro et al., "UCF101: A Dataset of 101 Human Actions Classes from Videos in the Wild," Center for Research in Computer Vision, University of Central Florida, CRCV-TR-12-01, Nov. 2012, 7 pages.
Tran et al., "Learning spatiotemporal features with 3D convolutional networks," Proceedings of the IEEE International Conference on Computer Vision (ICCV), Dec. 2015, pp. 4489-4497.
Tulyakov et al., "MoCoGAN: Decomposing motion and content for video generation," Proceedings of the IEEE Conference on Computer Vision and Pattern Recognition (CVPR), Jun. 2018, pp. 1526-1535.
Tzen et al., "Neural stochastic differential equations: Deep latent gaussian models in the diffusion limit," CoRR, submitted on Oct. 28, 2019, arXiv:1905.09883v2, 18 pages.
Vaswani et al., "Attention is all you need," Proceedings of the 31st International Conference on Neural Information Processing Systems, Dec. 2017, pp. 6000-6010.
Vincent, "A connection between score matching and denoising autoencoders," Neural Computation, Jul. 2011, 23(7):1661-1674.
Walker et al., "Predicting video with VQVAE," CoRR, submitted on Mar. 2, 2021, arXiv:2103.01950v1, 13 pages.
Wang et al., "Non-local neural networks," Proceedings of 2018 IEEE/CVF Conference on Computer Vision and Pattern Recognition (CVPR), Jun. 2018, pp. 7794-7803.

(56) References Cited

OTHER PUBLICATIONS

Weissenborn et al., "Scaling autoregressive video models," CoRR, submitted on Jun. 6, 2019, arXiv:1906.02634v1, 22 pages.
Whang et al., "Deblurring via stochastic refinement," CoRR, submitted on Dec. 28, 2021, arXiv:2112.02475v2, 28 pages.
Yan et al., "VideoGPT: Video generation using VQ-VAE and transformers," CoRR, submitted on Sep. 14, 2021, arXiv:2104.10157v2, 14 pages.
Yushchenko et al., "Markov decision process for video generation," Proceedings of the IEEE/CVF International Conference on Computer Vision Workshops, Oct. 2019, 10 pages.
Zagoruyko et al., "Wide residual networks," CoRR, submitted on Nov. 28, 2016, arXiv:1605.07146v2, 15 pages.

* cited by examiner

GENERATING VIDEOS USING DIFFUSION MODELS

BACKGROUND

This specification relates to generating videos using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that generates a video using a diffusion neural network.

Particular embodiments of the subject matter described in this specification can be implemented so as to realize one or more of the following advantages.

Other systems that generate videos using diffusion use an image diffusion model to predict each individual frame. For example, these systems may predict a next frame of a video autoregressively using a recurrent neural network. The system described in this specification jointly models entire videos, or blocks of frames, using a 3D video architecture. As a result, the system generates videos of higher perceptual quality than other systems.

Conventional systems for generating longer videos based on an input video show a lack of temporal coherence between the input video and the generated frames. The system described in this specification uses a diffusion model that is adjusted by guidance from the input video, which enables generating temporally coherent longer videos based on an input video.

The system outputs videos with high sample quality for tasks such as video prediction, conditional video generation, and unconditional video generation. The system can generate high quality videos using a diffusion model that is jointly trained from image and video data. Training the diffusion model using images increases the amount and diversity of training data available. For example, there are typically more high quality images than there are high quality videos. In addition, each video frame in a video is an image that can be used as training data. A larger training dataset can improve the performance of the diffusion model.

The system also outputs videos with high sample quality for text-conditioned video generation. For example, in implementations where the diffusion model is conditional, the system can use a modified diffusion sampler to generate videos that reflect the text.

The system is also computationally efficient. For example, the system uses factorized space-time attention in the diffusion model. The factorized space-time attention makes it straightforward to mask the model to run on independent images rather than a video, which allows the diffusion model to be jointly trained for both video and image generation. Joint training, i.e., training using both images and videos, reduces the variance of minibatch gradients and speeds up optimization. For example, adding more independent image frames can be seen as a memory optimization to fit more independent examples in a batch.

The system also saves computational resources during training. For example, the system can generate longer videos of arbitrary length, but does not need to be trained on videos of longer lengths. During training, the system can be trained on a small subset of frames at a time. During generation, the system can autoregressively generate longer videos based on an input video using a conditional diffusion model conditioned on the input video.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
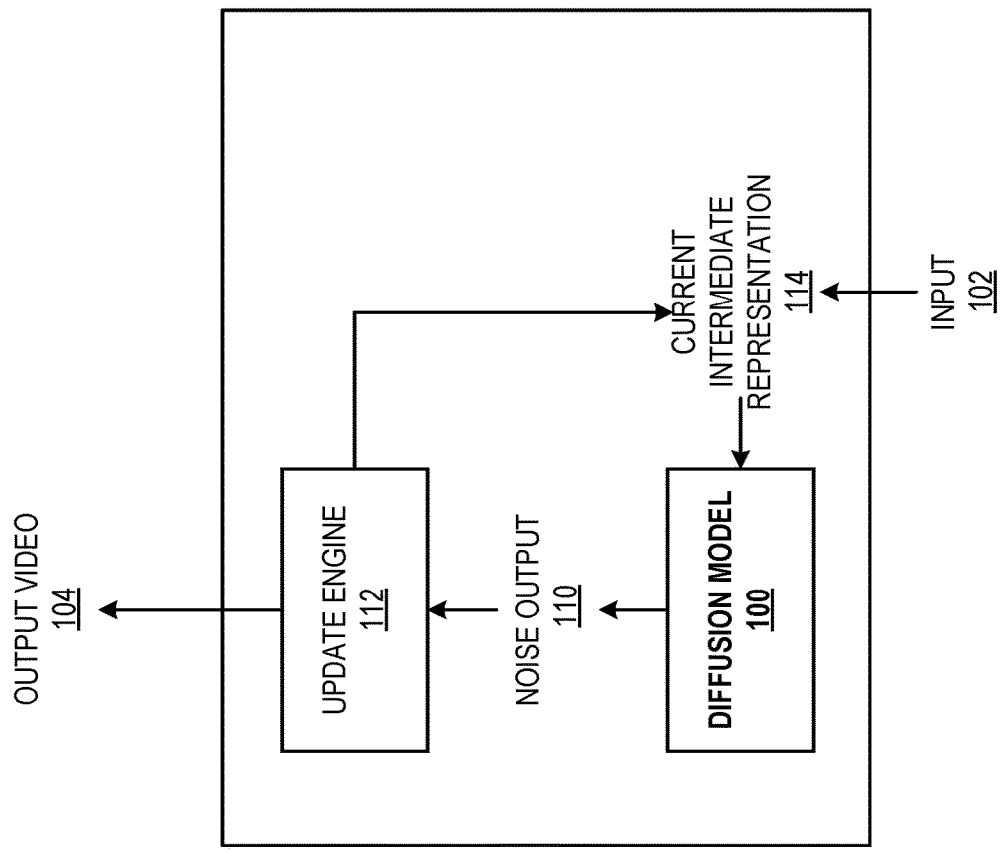
FIG. 1 is a block diagram of an example video generation system.

FIG. 1 is a block diagram of an example video generation system 100. The video generation system 100 is an example of a system implemented as computer programs on one or more computers in one or more locations in which the systems, components, and techniques described below are implemented.

The video generation system 100 generates an output video 104 given an input 102. The input 102 can include video frames that each include pixels. Each pixel in each video frame has one or more intensity values, and at least a subset of the intensity values for the pixels in the video frames are sampled from a noise distribution (e.g., a Gaussian distribution, such as N(0,I), where I is an identity matrix). In some implementations, the input 102 can include one or more video frames from an existing video.

In some implementations, the input 102 can be generated by the video generation system 100. For example, the video generation system 100 can generate an input 102 where every pixel in every video frame has intensity values that are sampled from a noise distribution.

To generate a video, the video generation system 100 obtains the input 102 and initializes a current intermediate representation 114 (that is, can generate the first instance of the current intermediate representation 114) from the video frames of input 102.

The video generation system 100 then generates the output video 104 by updating the current intermediate representation 114 at each of multiple iterations. The output video 104 is the current intermediate representation 114 after the last iteration of the multiple iterations.

In some implementations, the number of iterations is fixed. In other implementations, the video generation system 100 or another system can adjust the number of iterations based on a performance metric of the output video 104. That is, the video generation system 100 can select the number of iterations so that the output video 104 will be generated to satisfy the performance metric.

In other implementations, the video generation system 100 or another system can adjust the number of iterations based on a computational resource consumption requirement for the generation of the output video 104, i.e., can select the number of iterations so that the output video 104 will be generated to satisfy the requirement.

At each iteration, the video generation system 100 processes an intermediate input for the iteration that includes the current intermediate representation using a diffusion model 400. In some implementations, each iteration corresponds to a noise level, and the intermediate input can also include the noise level for the iteration.

The diffusion model 400 is a neural network that has parameters and that is configured to process the intermediate input in accordance with the current values of the parameters to generate a noise output 110. The noise output 110 includes a noise estimate for each pixel in each video frame of the intermediate input. An example diffusion model is discussed with reference to FIG. 4.

Generally, the noise estimate for a given pixel in the current intermediate representation is an estimate of the noise that has been added to the corresponding actual pixel in the actual output for the input in order to generate the given pixel. That is, the noise estimate defines how the actual pixel, if known, would need to be modified to generate the given pixel in the current intermediate representation given a noise level corresponding to the current iteration. In other words, the given pixel could be generated by applying the noise estimate to the actual pixel in accordance with the noise level for the current iteration.

At each iteration, the video generation system 100 then uses an update engine 112 to update the current intermediate representation 114 in the direction of the noise output 110 for the iteration.

In particular, the update engine 112 updates the current intermediate representation 114 using the noise output 110 and the noise level for the iteration. That is, the update engine 112 generates a prediction of the output video 104 by updating each pixel of the current intermediate representation 114 using the corresponding noise estimate of the noise output 110 and the corresponding noise level at the iteration. The update engine 112 then updates the current intermediate representation 114 by applying a diffusion sampler to the prediction of the output video 104. Updating the current intermediate representation is discussed in further detail with reference to FIG. 3.

At the final iteration, the video generation system 100 outputs the prediction of the output video 104 as the output video 104. For example, the video generation system 100 can show the video on a user display or transmit the video for display.

Prior to the video generation system 100 using the diffusion model 400 to generate output videos, a training system trains the diffusion model 400 on training data. The training is described below with reference to FIG. 6.

In some implementations, the video generation system 100 can generate an output video conditioned on a conditioning signal. For example, the conditioning signal can represent a sequence of text, class label, or other type of conditioning.

In some implementations, the video generation system 100 can use the video frames from the input to generate a longer video, to temporally upsample the given video frames, or to spatially upsample the given video frames. Generating an output video based on a given video is described below with reference to FIGS. 2-6.

Figure 2:
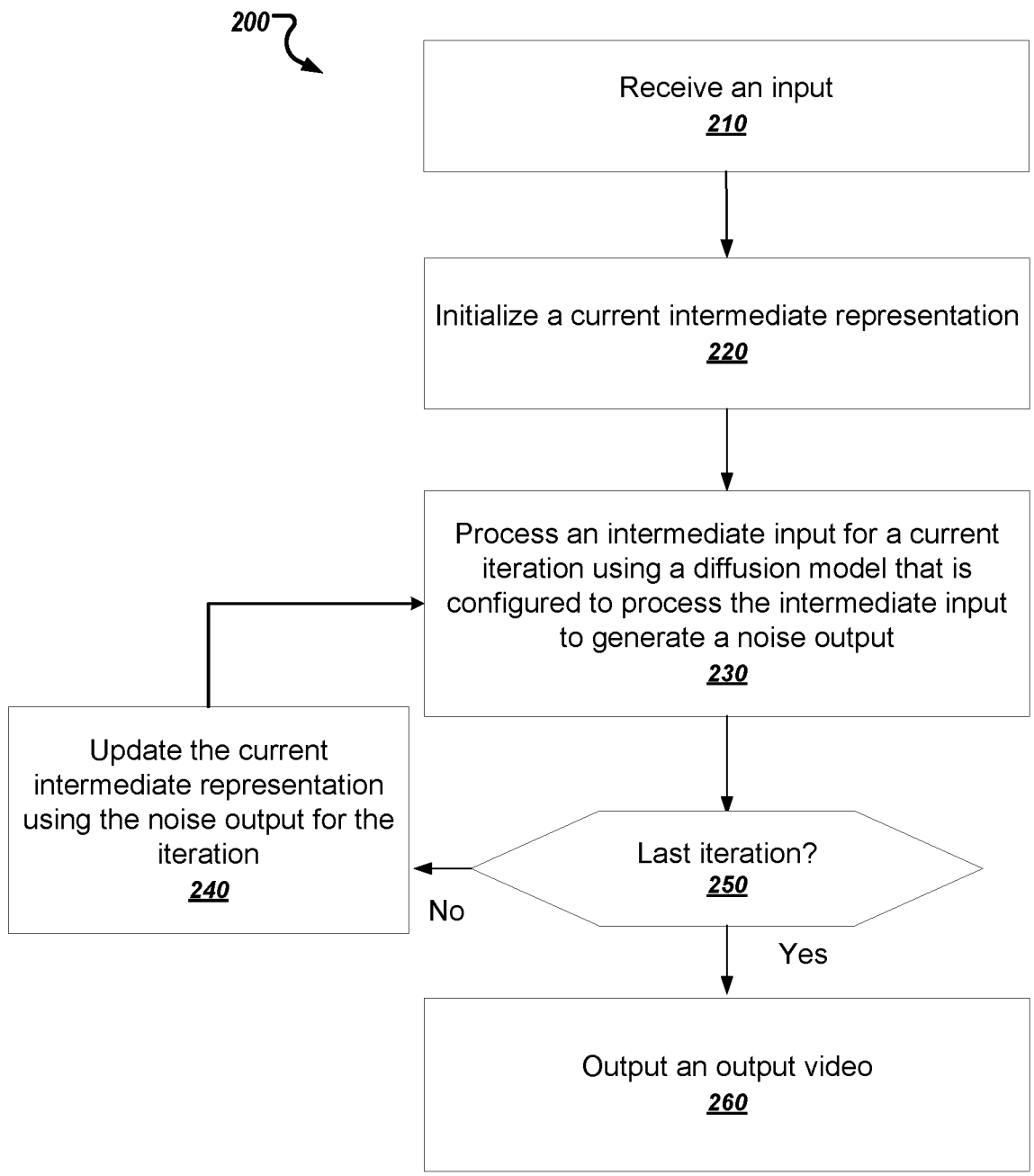
FIG. 2 is a diagram of an example diffusion model.

FIG. 2 is a flow diagram of an example process 200 for generating videos. For convenience, the process 200 will be described as being performed by a system of one or more computers located in one or more locations. For example, a video generation system, e.g., the video generation system 100 of FIG. 1, appropriately programmed in accordance with this specification, can perform the process 200.

The system receives an input (step 210) on which to condition an output video. The input includes one or more video frames that each have multiple pixels. Each pixel in each video frame has one or more intensity values, and at least a subset of the intensity values for the pixels in the video frames are sampled from a noise distribution. In some implementations, the system can generate the input. For example, the system can sample all of the intensity values for the pixels in the video frames from a noise distribution. For example, the intensity values can be sampled from a Gaussian noise distribution $N(0,I)$, where $I$ is an identity matrix. In some implementations, the input can also include a conditioning signal. That is, the diffusion model can be a conditional diffusion model that is conditioned on the conditioning signal. In some implementations, the system can receive an input that includes a condition, and the system can provide the condition to the conditional diffusion model by generating a conditioning signal that represents the condition.

For example, the conditioning signal can represent a sequence of text. In these implementations, the output video is a video that reflects the text. Example sequences of text could include "4K Illuminated Christmas Tree at Night During Snowstorm," "Aerial of horses on a pasture," "Abstract background," etc. The system can generate the conditioning signal by generating an embedding of the sequence of text, e.g., by processing the sequence of text using an encoder neural network. For example, the embedding can be a BERT-large embedding processed using attention pooling.

The system initializes a current intermediate representation (step 220). The current intermediate representation $z_t$ includes a current intensity value for each of the pixels in each of the video frames. For example, where all of the intensity values for the pixels in the video frames are sampled from a noise distribution, the initial current intermediate representation $z_t$, where $t=1$, can be represented as $z_1 \sim N(0,I)$.

At each of the multiple iterations, the system processes an intermediate input for the iteration using a diffusion model that is configured to process the intermediate input to generate a noise output (step 230). The intermediate input can include the current intermediate representation and a noise level, such as a log signal-to-noise-ratio $\lambda_t$. In some implementations where the diffusion model is a conditional diffusion model, the intermediate input can include conditioning information such as a conditioning signal. An example of a diffusion model that can be used in step 230 is described below in FIG. 4.

Generally, a diffusion model specified in continuous time is a generative model with latents $z=\{z_t | t \in [0,1]\}$ obeying a forward process $q(z|x)$ starting at data $x \sim p(x)$ where $p(x)$ is the probability density for data $x$. To train a diffusion model, a training system learns a forward process that adds noise to training data such as a video that is not noisy. The training system then performs a reverse process that starts with a noisy video, and then removes noise from the noisy video until arriving at a prediction of a not noisy video. Training will be discussed in further detail below in FIG. 6.

The forward process that gradually adds noise to a video is a Gaussian process that satisfies the Markovian structure, where $0 \leq s < t \leq 1$, t is an index that corresponds to the current iteration, and s is an index that corresponds to a previous iteration in the forward process:

$$q(z_t | x) = N(z_t; \alpha_t x, \sigma_t^2 I), q(z_t | z_s) = N(z_t; (\alpha_t/\alpha_s)z_s, \sigma_{t|s}^2 I)$$

where $\sigma_{t|s}^2 = (1-e^{\lambda_t - \lambda_s})\sigma_t^2$, and $\alpha_t$, $\sigma_t$ specify a differentiable noise schedule whose log signal-to-noise-ratio $\lambda_t = \log [\alpha_t^2/\sigma_t^2]$ decreases with t until $q(z_1) \approx N(0,I)$.

The reverse process starts with noisy video $z_t$ and removes noise at each iteration to generate a less noisy video $z_s$, where s and t are defined as above, but in the reverse process, s corresponds to a next iteration.

The diffusion model receives a noisy video $z_t$ and generates a noise output that predicts a noise component in the noisy video $z_t$ for the iteration that is used to generate a video with less noise $z_s$. The noise output will be described in further detail below with reference to FIG. 3.

At each of the multiple iterations except the last iteration, the system updates the current intermediate representation using the noise output for the iteration (step 240). For example, the system generates a prediction of the output video $\hat{x}_\theta(z_t)$ using the current intermediate representation $z_t$ and the noise output. The system updates the current intermediate representation by applying a diffusion sampler to the prediction of the output video $\hat{x}_\theta(z_t)$. Applying a diffusion sampler to the prediction of the output video $\hat{x}_\theta(z_t)$ results in a new current intermediate representation $z_s$, where $0 \leq s < t \leq 1$. The system can update the current intermediate representation $z_t$ to be $z_s$. Updating the current intermediate representation will be described in further detail below with reference to FIG. 3.

Generally, the current intermediate representation at each iteration can be interpreted as the output video with additional noise. That is, the current intermediate representations are noisy versions of the output video. For example, for an initial current intermediate representation $z_t$, where t represents the number of iterations, the system can update the current intermediate representation at each of iterations t through 0 by removing an estimate for the noise corresponding to the iteration. That is, the system can refine the current intermediate representation at each iteration by determining an estimate for the noise and updating the current intermediate representation in accordance with the estimate. The system can use a descending order for the iterations until outputting the output video.

If it is not the last iteration at step 250, that is, if $t>0$, the system returns to step 230.

If it is the last iteration at step 250, that is, if $t=0$, the system outputs an output video (step 260), which is the prediction of the output video at the final iteration, $\hat{x}_\theta(z_0)$. That is, at the last iteration, the system generates a prediction of the output video using the current intermediate representation and the noise output, but does not update the current intermediate representation by applying a diffusion sampler to the prediction of the output video.

Figure 3:
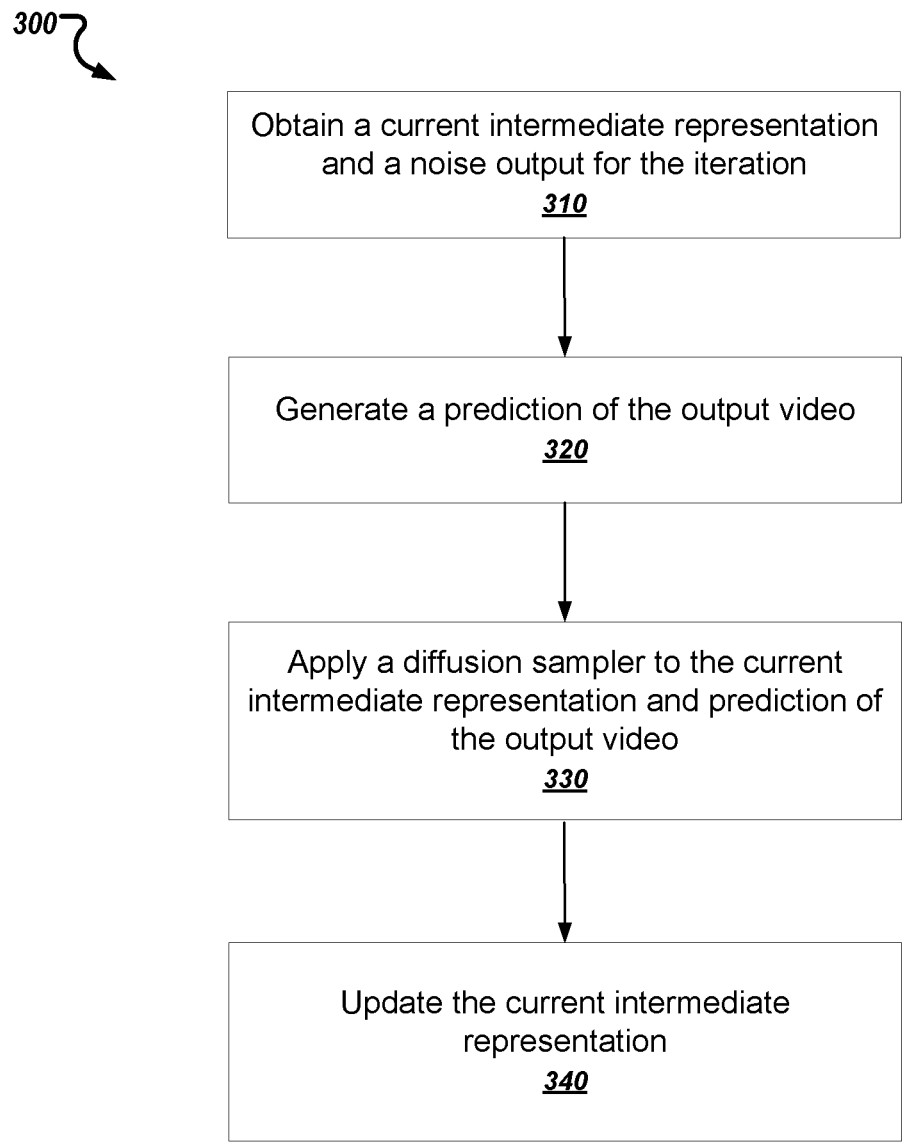
FIG. 3 is a flow diagram of an example process for generating videos.

FIG. 3 is a flow diagram of an example process 300 for updating the current intermediate representation. For convenience, the process 300 will be described as being performed by a system of one or more computers located in one or more locations. For example, an update engine, e.g., the update engine 112 of the video generation system 100 of FIG. 1, appropriately programmed in accordance with this specification, can perform the process 300.

The update engine performs the process 300 at each iteration $t>0$.

The update engine obtains a current intermediate representation $z_t$ and a noise output $\epsilon_\theta(z_t)$ for the iteration (step 310). For example, the current intermediate representation can be the current intermediate representation 114 of FIG. 1 that is input to a diffusion model 400. The noise output can be the noise output 110 of FIG. 1 that is generated by the diffusion model 400. In some implementations, the noise output $\epsilon_\theta$ was trained using a mean squared error in $\epsilon$ space with t sampled according to a cosine schedule. This corresponds to a particular weighting $w(\lambda_t)$ for learning $$\epsilon_\theta(z_t) \approx -\sigma_t \nabla_{z_t} \log p(z_t)$$

where $p(z_t)$ is the true density of $z_t$ under $x \sim p(x)$.

In some implementations, the update engine is part of a video generation system that generates videos conditioned on a conditioning signal c. The conditioning signal may represent, for example, a sequence of text. In these implementations, the noise output can be adjusted to adjusted noise output $\tilde{\epsilon}_\theta$ which can be constructed as:

$$\tilde{\epsilon}_\theta(z_t, c) = (1 + w)\epsilon_\theta(z_t, c) - w\epsilon_\theta(z_t)$$

where w is the guidance strength, $$\epsilon_\theta(z_t, c) = \frac{1}{\sigma_t}(z_t - \hat{x}_\theta(z_t, c))$$

is the conditional model prediction, and $\epsilon_\theta(z_t)$ is a prediction from an unconditional model jointly trained with the conditional model. In some implementations, where the conditioning signal c is represented as embedding vectors, unconditional modeling can be represented as $c=0$, i.e., $\epsilon_\theta(z_t) = \epsilon_\theta(z_t, c=0)$.

For $w>0$ this adjustment has the effect of emphasizing the effect of conditioning on the signal c, which tends to produce samples of lower diversity but higher quality compared to sampling from the regular conditional model. This use of classifier-free guidance can lead to improved sample quality.

The update engine generates a prediction of the output video $\hat{x}_\theta(z_t, \lambda_t)$ by updating each pixel of the current intermediate representation $z_t$ using the corresponding noise estimate of the noise output $\epsilon_\theta(z_t)$ and a noise level for the iteration (step 320). To simplify notation, the dependence on $\lambda_t$ may be dropped throughout this specification. For example, the noise level for the iteration can be defined by $\alpha_t$ and $\sigma_t$ that specify a differentiable noise schedule whose log signal-to-noise-ratio $\lambda_t = \log [a_t^2/\sigma_t^2]$ decreases with t until $q(z_1) \approx N(0,I)$.

The prediction of the output video $\hat{x}_\theta(z_t)$ can be defined using an $\epsilon$-prediction parametrization:

$$\hat{x}_\theta(z_t) = (z_t - \sigma_t \epsilon_\theta(z_t))/\alpha_t$$

In some implementations, the prediction of the output video can be defined using v-prediction parametrization.

In implementations where the video generation system generates videos conditioned on a conditioning signal c, the prediction of the output video generated by a conditional diffusion model for the iteration is $\hat{x}_\theta(z_t, c)$ and uses adjusted noise output $\tilde{\epsilon}_\theta(z_t, c)$. In these implementations, the prediction of the output video is generated from a weighted combination of a noise output from a conditional diffusion model and a noise output from the unconditional diffusion model.

The update engine applies a diffusion sampler to the current intermediate representation and prediction of the output video (step 330). Applying the diffusion sampler results in generating $z_s$ given the current intermediate representation $z_t$ and the prediction of the output video $\hat{x}_\theta(z_t)$, where s<t.

For example, applying the diffusion sampler can include using a discrete time ancestral sampler. In some implementations, the discrete time ancestral sampler can follow the rule:

$$z_s = \tilde{\mu}_{s|t}(z_t, \hat{x}_\theta(z_t)) + \sqrt{(\tilde{\sigma}^2_{s|t})^{1-\gamma}(\sigma^2_{t|s})^\gamma}\, \epsilon$$

where $$\tilde{\mu}_{s|t}(z_t, x) = e^{\lambda_t - \lambda_s}\left(\frac{\alpha_s}{\alpha_t}\right)z_t + (1 - e^{\lambda_t - \lambda_s})\alpha_s x$$

and where $$\tilde{\sigma}^2_{s|t} = (1 - e^{\lambda_t - \lambda_s})\sigma^2_s$$

and where $\epsilon$ is standard Gaussian noise, $\gamma$ is a hyperparameter that controls the stochasticity of the sampler, and s, t follow a uniformly spaced sequence from 1 to 0.

In some implementations, applying the diffusion sampler can include using a predictor-corrector sampler. For example, applying the diffusion sampler can include alternating between an ancestral sampler step (e.g., the discrete time ancestral sampler rule described above) and a Langevin correction step. That is, at each iteration, the update engine can use the ancestral sampler step described above, and modify the output $z_s$ of the ancestral sampler step with the Langevin correction step.

For example, the Langevin correction step can have the following form:

$$z_s \leftarrow z_s - \frac{1}{2}\delta\sigma_s\epsilon_\theta(z_s) + \sqrt{\delta}\,\sigma_s\epsilon'$$

where $\delta$ is a step size. In some implementations, the step size can be fixed, for example, to 0.1. $\epsilon'$ is an independent sample of standard Gaussian noise and $\epsilon_\theta(z_s)$ is the noise output given $z_s$. The Langevin step removes noise $\epsilon_\theta(z_s)$ and adds in some Gaussian noise $\epsilon'$. The Langevin step helps the marginal distribution of each $z_s$ generated by the diffusion sampler to match the true marginal under the forward process starting at x~p(x).

In implementations where the video generation system generates videos conditioned on a conditioning signal c, applying the diffusion sampler can include alternating between an adjusted ancestral sampler step and an adjusted Langevin correction step. For example, the prediction of the output video generated by a conditional diffusion model for the iteration is $\hat{x}_\theta(z_t, c)$. The discrete time ancestral sampler rule described above can be adjusted to use $\hat{x}_\theta(z_t, c)$ instead of $\hat{x}_\theta(z_t)$. In addition, the Langevin correction step can use adjusted noise output $\tilde{\epsilon}_\theta(z_t, c)$ as described above.

The update engine updates the current intermediate representation (step 340). The update engine can update the current intermediate representation $z_t$ to be the output of applying the diffusion sampler, $z_s$.

At the last iteration t=0, the update engine performs steps 310 and 320. Thus the output video is the last prediction of the output video, $\hat{x}_\theta(z_0)$.

Figure 4:
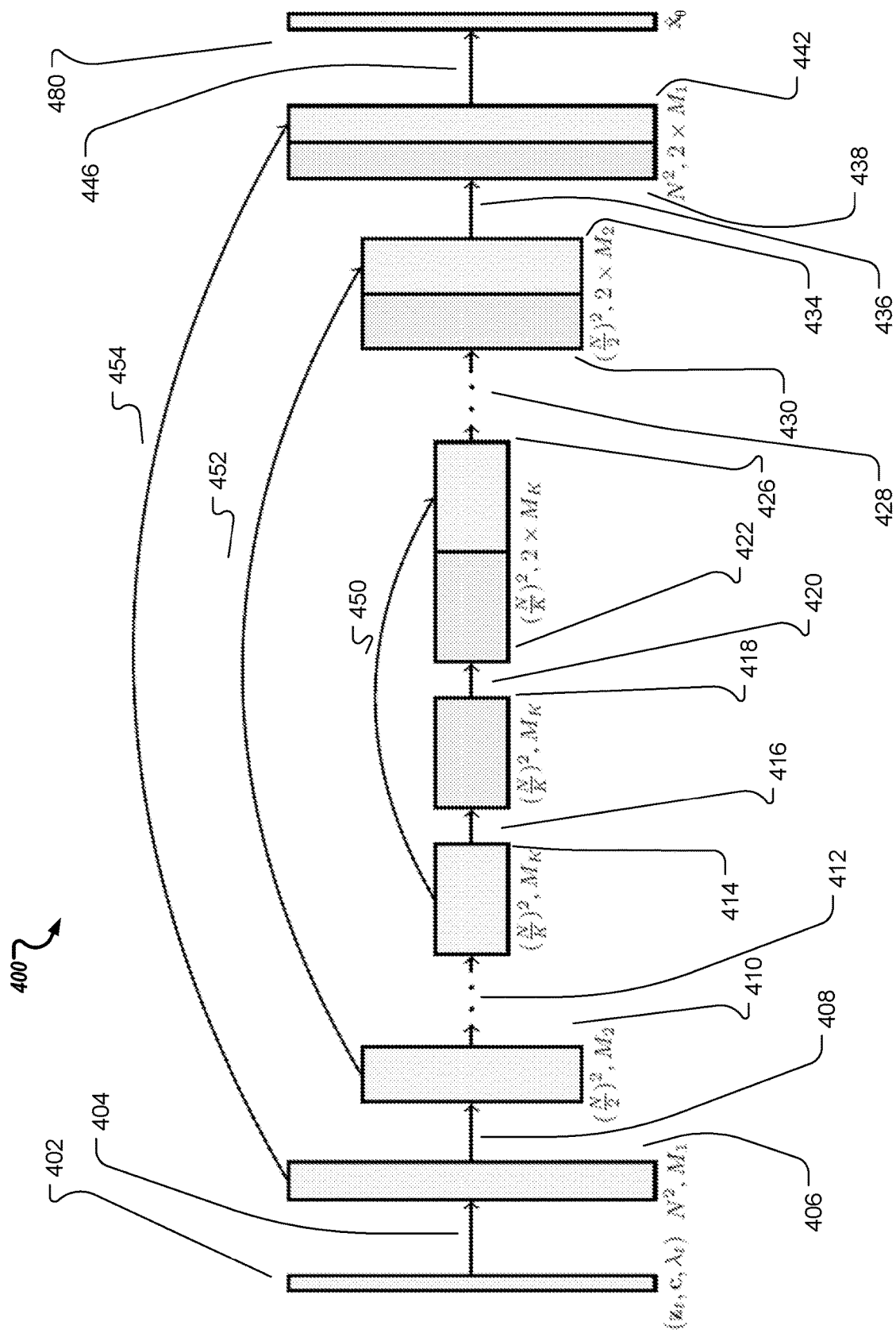
FIG. 4 is a flow diagram of an example process for updating a current intermediate representation.

FIG. 4 is a diagram of an example diffusion model 400. The model 400 is an example of a diffusion model that a video generation system can use to generate a noise output, for example, to perform step 230 of FIG. 2.

The example diffusion model 400 shows a 3D U-Net that is factorized over space and time. That is, some of the operations in the 3D U-Net operate over space, and some of the operations operate over time. For example, operations that operate over space operate over individual video frames. Operations that operate over time operate over patches of pixels at the same spatial location across video frames.

The diffusion model is configured to process a current intermediate representation through a sequence of convolutional network blocks to generate the noise output 246 at each of multiple iterations t. The convolutional network blocks can be residual network blocks.

For each iteration t, the diffusion model 400 obtains an intermediate input 402. The intermediate input 402 includes a current intermediate representation, $z_t$, which is a noisy video. In some implementations, the intermediate input 402 can also include a conditioning signal c or log signal-to-noise-ratio $\lambda_t$ (also referred to as "noise level") or both.

The diffusion model 400 includes a sequence of convolutional network blocks that includes a downsampling pass followed by an upsampling pass.

The sequence of convolutional network blocks can include downsampling blocks (e.g., arrows 408 and 412), upsampling blocks (e.g., the arrows 428 and 436), and attention blocks. The sequence of convolutional network blocks can also include transformer layers that do not change the dimensionality of inputs (e.g., arrows 416 and 420). The blocks 406, 410, 414, 418, 422, 426, 430, 434, 438, and 442 represent 4D tensors with axes of frames, height, width, and channels.

In some implementations, conditioning information, such as a conditioning signal c or noise level can be provided to the diffusion model 400 in the form of an embedding vector added into each residual block. In some implementations, the diffusion model 400 can process these embedding vectors using several multi-layer perceptron (MLP) layers. In these implementations, the diffusion model 400 is a conditional diffusion model conditioned on an embedding vector representing the conditioning signal c.

The convolutional network blocks perform space-only 3D convolution. That is, the convolutional network blocks perform convolution over individual video frames. For example, each space-only 3D convolution is a 1×3×3 convolution where the first axis indexes video frames, the second axis indexes the spatial height of the video frames, and the third axis indexes the spatial width of the video frames. The convolutional network blocks can include layers such as rectified linear unit (ReLU) layers, or max pooling layers.

For example, the diffusion model 400 uses a convolutional network block 404 to perform a space-only 3D convolution on the intermediate input 402 to generate block 406, which has a spatial resolution height×width of $N^2$ and a channel multiplier $M_1$.

Each downsampling block downsamples an input to the downsampling block at each downsampling iteration. For example, a downsampling block can be a convolutional layer with the necessary stride to reduce ("downsample" the dimensionality of the input). In the example diffusion model 400, each downsampling block adjusts the spatial resolution of the input to the downsampling block by a factor of 2 through each of K blocks, where K is an integer greater than one. For example, the diffusion model 400 provides the input block 406 to the downsampling block 408, resulting in an output block 410 with a reduced spatial resolution of $$\left(\frac{N}{2}\right)^2$$

and an increased channel multiplier $M_2$. The diffusion model 400 uses the remaining downsampling blocks 412 to generate output blocks up to K, with the output block 414 having a spatial resolution of $$\left(\frac{N}{K}\right)^2$$

and a channel multiplier $M_K$.

The diffusion model 400 can use an additional transformer layer 416 (e.g., an MLP with self-attention) to generate a final output block 418 for the downsampling pass having a spatial resolution of $$\left(\frac{N}{K}\right)^2$$

and a channel multiplier $M_K$. The diffusion model 400 can also use a transformer layer 420 to generate an input block 422 for the upsampling pass having a spatial resolution of $$\left(\frac{N}{K}\right)^2$$

and a channel multiplier $M_K$.

The diffusion model 400 can maintain a feature map from block 414. The diffusion model 400 can apply a spatial attention block over the feature map to generate a spatial attention feature map, and apply a temporal attention block over the spatial attention feature map to generate a spatial temporal attention feature map. The spatial temporal feature map can be concatenated to block 422 as block 426. The spatial attention feature map and spatial temporal attention feature map will be described in further detail below.

Each upsampling block upsamples an input to the upsampling block at each upsampling iteration. For example, an upsampling block can be a neural network layer that "upsamples" (that is, increases) the dimensionality of an input and generates an output that has a higher dimensionality than the input to the upsampling block. In the example diffusion model 400, each upsampling block adjusts the spatial resolution of the input to the upsampling block by a factor of 2 through each of K blocks. For example, the input to the first upsampling block in arrows 428 is block 422, with a spatial resolution of $$\left(\frac{N}{K}\right)^2$$

and a channel multiplier $M_K$. The diffusion model 200 provides the input block 422 to the upsampling blocks 428, resulting in an output block 430 with an increased spatial resolution of $$\left(\frac{N}{2}\right)^2$$

and a reduced channel multiplier $M_2$. The input block 430 to the upsampling block 436 results in an output block 438 with a spatial resolution of $N^2$ and a channel multiplier $M_1$.

The upsampling pass can have concatenation skip connections 450, 452, and 454, to the downsampling pass. That is, at each upsampling iteration, the diffusion model 400 maintains a feature map from the corresponding downsampling block. For example, the corresponding downsampling block is the downsampling block that receives inputs that are the same resolution as the output of the upsampling block. In the example of FIG. 4, the diffusion model 400 maintains a feature map for upsampled block 438 from block 406, a feature map for upsampled block 430 from block 410, and a feature map for block 422 from block 414.

The diffusion model 400 applies a spatial attention block over the feature map from the corresponding downsampling block to generate a spatial attention feature map by applying spatial attention over the values within each video frame. Spatial attention can be implemented by treating the axis that indexes video frames as a batch axis.

The diffusion model 400 applies a temporal attention block over the spatial attention feature map to generate a spatial temporal attention feature map by applying temporal attention over patches across the video frames. For example, each video frame can be decomposed into non-overlapping patches at the same spatial location that span the entire video frame. Temporal attention can be implemented by treating the axes that index the spatial height and width as batch axes. The use of factorized space-time attention allows for greater computational efficiency. In some implementations, each temporal attention block can include relative position embeddings so that the diffusion model 400 can distinguish ordering of the video frames in a way that does not require an absolute notion of video time.

For example, the diffusion model 400 can apply a spatial attention block and temporal attention block to the feature map of block 414, resulting in a spatial temporal attention feature map 426.

The diffusion model 400 applies the spatial temporal attention feature map to the output of the upsampling block. For example, FIG. 4 shows that the spatial temporal attention feature maps from downsampling blocks are concatenated to the corresponding upsampling blocks through skip connections 450, 452, and 454. The spatial temporal attention feature map for block 414 can be concatenated to block 422 as block 426. The spatial temporal attention feature map for block 410 can be concatenated to block 430 as block 434. The spatial temporal attention feature map for block 406 can be concatenated to block 438 as block 442. After each concatenation, the diffusion model 400 can use a convolutional neural network to perform space-only 3D convolution, and provide the output as input to the next upsampling iteration.

The noise output 446 includes the output of the upsampling block at the last upsampling iteration.

The video generation system can use diffusion model 400 to generate the noise output 446 at each of multiple iterations. The video generation system can perform steps 310 to 340 of FIG. 3 to update the current intermediate representation using the output of the diffusion model, e.g., obtain a current intermediate representation and noise output for the iteration, generate a prediction of the output video 480, apply a diffusion sampler to the current intermediate representation and prediction of the output video 480, and update the current intermediate representation.

In some implementations, the diffusion model 400 can be used to generate images. The diffusion model 400 can be configured to generate images by providing independent images in input 402, by masking or removing the attention operation inside each time attention block. For example, rather than comparing patches across video frames to generate key, query, and value vectors, the diffusion model can fix the attention matrix to exactly match each key and query vector at each video frame. A training system can jointly train a diffusion model 400 on both video and image generation, which improves sample quality.

Figure 5:
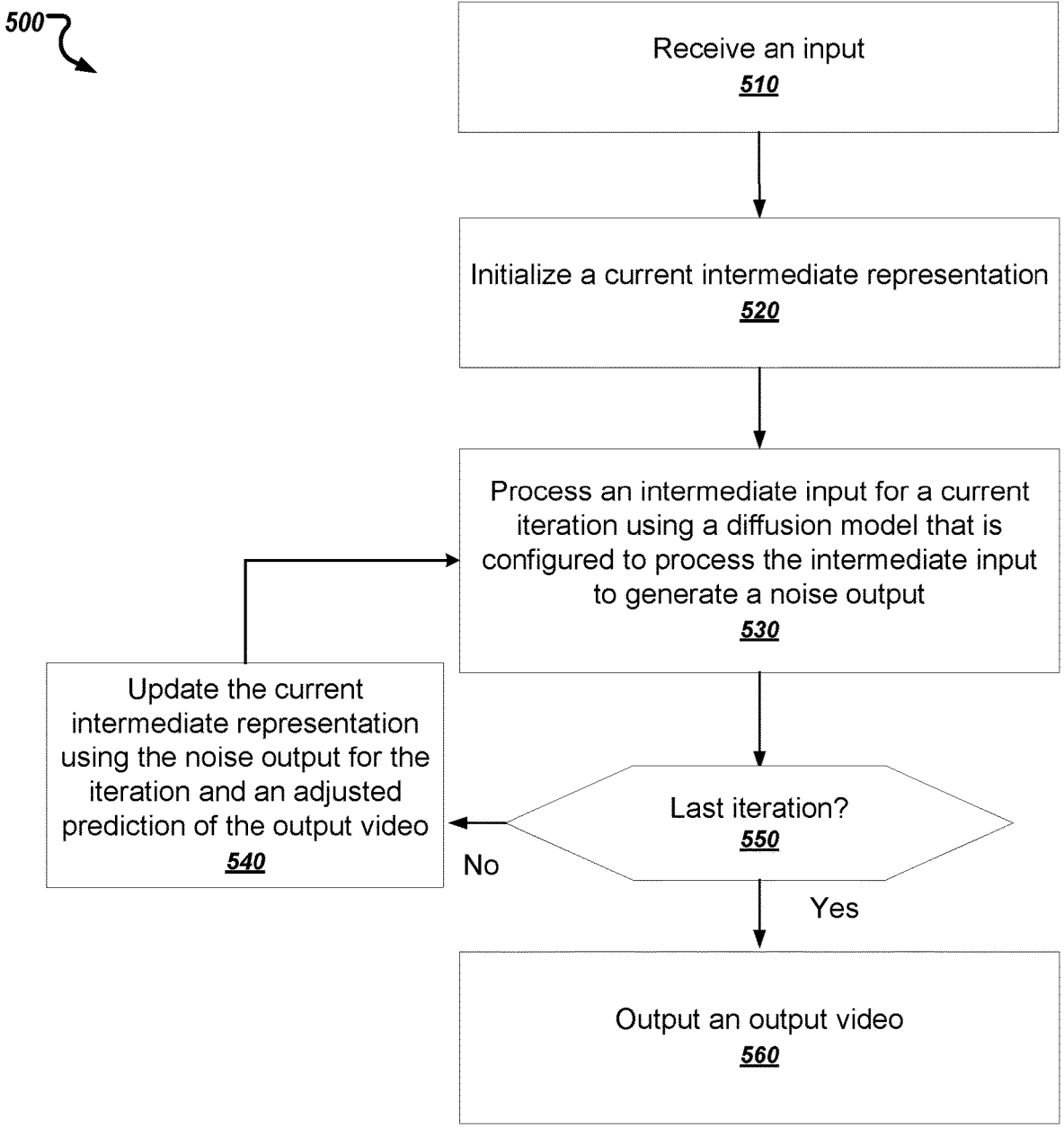
FIG. 5 is a flow diagram of an example process for generating a temporally extended video.

FIG. 5 is a flow diagram of an example process 500 for generating a temporally extended video of an input video. For convenience, the process 500 will be described as being performed by a system of one or more computers located in one or more locations. For example, the video generation system 100 of FIG. 1, appropriately programmed in accordance with this specification, can perform the process 500.

The system receives an input (step 510) on which to condition an output video. The input includes one or more noisy video frames that each have multiple pixels and a conditioning signal. That is, the diffusion model can be a conditional diffusion model that is conditioned on the conditioning signal. In some implementations, the system can receive an input that includes a condition, and the system can provide the condition to the conditional diffusion model by generating a conditioning signal that represents the condition.

The input can include an input video $x^a$. For example, the output video can be a temporally extended video based on the video frames of $x^a$, a temporally upsampled video based on the video frames of the $x^a$, or a spatially upsampled video based on the video frames of the $x^a$.

A temporally extended video of the input video $x^a$ can include additional frames added to the end of the input video. For example, a temporally extended video can satisfy the task of video prediction, where a model is given the first one or more frames of a video and is asked to generate frames after the given frames. The system can generate an output video with frames $x^b$ that are conditioned on an input video $x^a$, so that $x^b \sim p_\theta(x^b|x^a)$ and the output video includes the frames of $x^a$ and frames that follow the input video $x^a$. The system can autoregressively extend the input video to arbitrary lengths, without having to use a diffusion model that has been trained to generate videos of those lengths. The diffusion model can be trained using a small subset of frames, that is, the diffusion model can be trained on shorter videos, than are generated through process 500.

In some implementations, the process 500 can be used to generate a temporally upsampled video. A temporally upsampled video has a higher frame rate. The output video includes frames $x^b$ that fall in between the frames of the input video $x^a$. Thus, $x^b$ and $x^a$ are disjoint.

In some implementations, the input video $x^a$ was generated by a system such as the video generation system 100 of FIG. 1. For example, the video generation system that generated $x^a$ could have generated $x^a$ unconditionally, or conditionally on a conditioning signal such as a sequence of text.

The system initializes a current intermediate representation (step 520). The current intermediate representation $z_t$ includes a current intensity value for each of the pixels in each of the video frames.

At each of the multiple iterations, the system processes an intermediate input for the iteration using a diffusion model that is configured to process the intermediate input to generate a noise output (step 530). The intermediate input can include the current intermediate representation and a noise level, such as a log signal-to-noise-ratio $\lambda_t$. The intermediate input can include conditioning information such as a conditioning signal. An example of a diffusion model that can be used in step 530 is described in FIG. 4.

The system can use a conditional diffusion model. The conditional model can be trained explicitly. In some implementations, the conditional model can be derived from the unconditional model by imputation, which does not require a separately trained model.

At each of the multiple iterations except the last iteration, the system updates the current intermediate representation using the noise output for the iteration and an adjusted prediction of the output video (step 540). For example, the system generates an adjusted prediction of the output video frames $\tilde{x}_\theta^b(z_t)$ using the current intermediate representation $z_t$ and the noise output. The adjusted prediction is adjusted by guidance from the video frames in the input. For example, the adjusted prediction $\tilde{x}_\theta^b$ can be adjusted by a weighting factor and an approximation for updating the latents $z_s^b$ in a direction that takes into account $x^a$.

The adjusted prediction of the output video frames $\tilde{x}_\theta^b(z_t)$ can be defined by:

$$\tilde{x}_\theta^b(z_t) = \hat{x}_\theta^b(z_t) - \frac{w_r \alpha_t}{2} \nabla_{z_t^b} \|x^a - \hat{x}_\theta^a(z_t)\|_2^2$$

where $\tilde{x}_\theta^b(z_t)$ is the prediction of the output video frames $x^b$ by the diffusion model, $\tilde{x}_\theta^a(z_t)$ is a reconstruction of $x^a$ by the diffusion model, and $w_r$ is a weighting factor. Sample quality increases with a larger weighting factor, for example, if $w_r > 1$. The gradient term is a form of guidance based on the model's reconstruction of the input video $x^a$. That is, $\|x^a - \tilde{x}_\theta^a(z_t)\|_2^2$ describes a reconstruction error between $x^a$ and what the diffusion model predicted for $x^a$. Taking the gradient $\nabla_{z_t^b}$ of the reconstruction error describes to what extent the latents for b were responsible for the reconstruction error. The gradient term is subtracted from the prediction of the output video.

The reconstruction $\hat{x}_\theta^a(z_t)$ can be generated by giving a noisy video to the diffusion model. For example, for a partitioned variable $x=(x^a, x^b)$, $x^a$ can represent the first six frames of a video, and $x^b$ can represent the following six frames of the video. $\hat{x}_\theta(z_t)$ is a denoised prediction of x. The system can then use the first six frames of $\hat{x}_\theta(z_t)$ as the reconstruction $\hat{x}_\theta^a(z_t)$.

As an example, the system can generate a 16-frame video that is a prediction of a 1-frame video. In this example, the diffusion model can be trained on a dataset of 16-frame videos. At inference, the system provides an input video with 16 noisy frames to the diffusion model, which outputs 16 predicted clean frames. The reconstruction error can thus be described as the squared error between the actual observed 1-frame video and the first predicted clean frame. In this example, the adjusted prediction of the output video can be defined by:

$$\tilde{x}_\theta(z_t) = \hat{x}_\theta(z_t) - \frac{w_r \alpha_t}{2} \nabla_{z_t} \|x^a - \hat{x}_\theta^a(z_t)\|_2^2$$

The system updates the current intermediate representation by applying a diffusion sampler that uses reconstruction guidance and/or a predictor-corrector sampler to the prediction of the output video frames $\tilde{x}_\theta^b(z_t)$ or output video $\tilde{x}_\theta(z_t)$. Applying a diffusion sampler to the prediction of the output video $\tilde{x}_\theta^b(z_t)$ or output video $\tilde{x}_\theta(z_t)$ results in a new current intermediate representation $z_s$, where $0 \leq s < t \leq 1$. The system can update the current intermediate representation $z_t$ to be $z_s$. For example, the diffusion sampler can use a replacement method with reconstruction guidance using the adjusted predictions described above. For example, the replacement sampling method can update the latents $z_s^b$ in the direction provided by:

$$\mathbb{E}_q[x^b|z_t, x^a] = \mathbb{E}_q[x^b|z_t] + (\sigma_t^2/\alpha_t)\nabla_{z_t^a} \log q(x^a|z_t)$$

$$\text{where } q(x^a|z_t) \approx N\left[\hat{x}_\theta^a(z_t), \frac{\sigma_t^2}{\alpha_t^2}I\right].$$

The system can also use a predictor-corrector sampler using Langevin diffusion with reconstruction guidance. Updating the current intermediate representation is described in further detail with reference to FIG. 3.

If it is not the last iteration at step 550, that is, if t>0, the system returns to step 530.

If it is the last iteration at step 550, that is, if t=0, the system outputs an output video (step 560), which is the prediction of the output video $\tilde{x}_\theta(z_0)$ at the final iteration, or the prediction of the output video frames at the final iteration, $\tilde{x}_\theta^b(z_0)$, concatenated with the input video $x^a$. That is, at the last iteration, the system generates an adjusted prediction of the output video using the current intermediate representation and the noise output, but does not update the current intermediate representation by applying a diffusion sampler to the adjusted prediction of the output video.

In some implementations, a similar process as process 500 can be used to generate a spatially upsampled video, where a mean squared error loss is imposed on a downsampled version of a model's prediction, and backpropagation is performed through the downsampling algorithm. A spatially upsampled video has higher spatial resolution than the input video. For example, a low-resolution video $x^a$ can be generated using a low-resolution diffusion model. The low-resolution video can be upsampled into a high-resolution video using a high-resolution diffusion model that generates predictions $\hat{x}_\theta(z_t)$.

The adjusted prediction of the output video $\tilde{x}_\theta(z_t)$ can be defined by:

$$\tilde{x}_\theta(z_t) = \hat{x}_\theta(z_t) - \frac{w_r \alpha_t}{2} \nabla_{z_t} \|x^a - \hat{x}_\theta^a(z_t)\|_2^2$$

where $\hat{x}_\theta(z_t)$ is the high-resolution diffusion's model prediction of the output video starting from noisy video $z_t$, and $\hat{x}_\theta^a(z_t)$ is the high-resolution diffusion model's reconstruction of the low-resolution video from $z_t$, which can be obtained by downsampling the high-resolution output of the model using a differentiable downsampling algorithm such as bilinear interpolation.

For example, during training of the high-resolution diffusion model, the training system can obtain high-resolution training videos. The training system can use bilinear downsampling to obtain a downsampled video $x^a$. The training system can obtain a prediction $\hat{x}_\theta^a(z_t)$ of downsampled video $x^a$ by performing backpropagation through the downsampling algorithm.

In some implementations, the system can simultaneously extend an input video temporally and upsample the video spatially. In some implementations, the system can simultaneously upsample an input video temporally and spatially.

Figure 6:
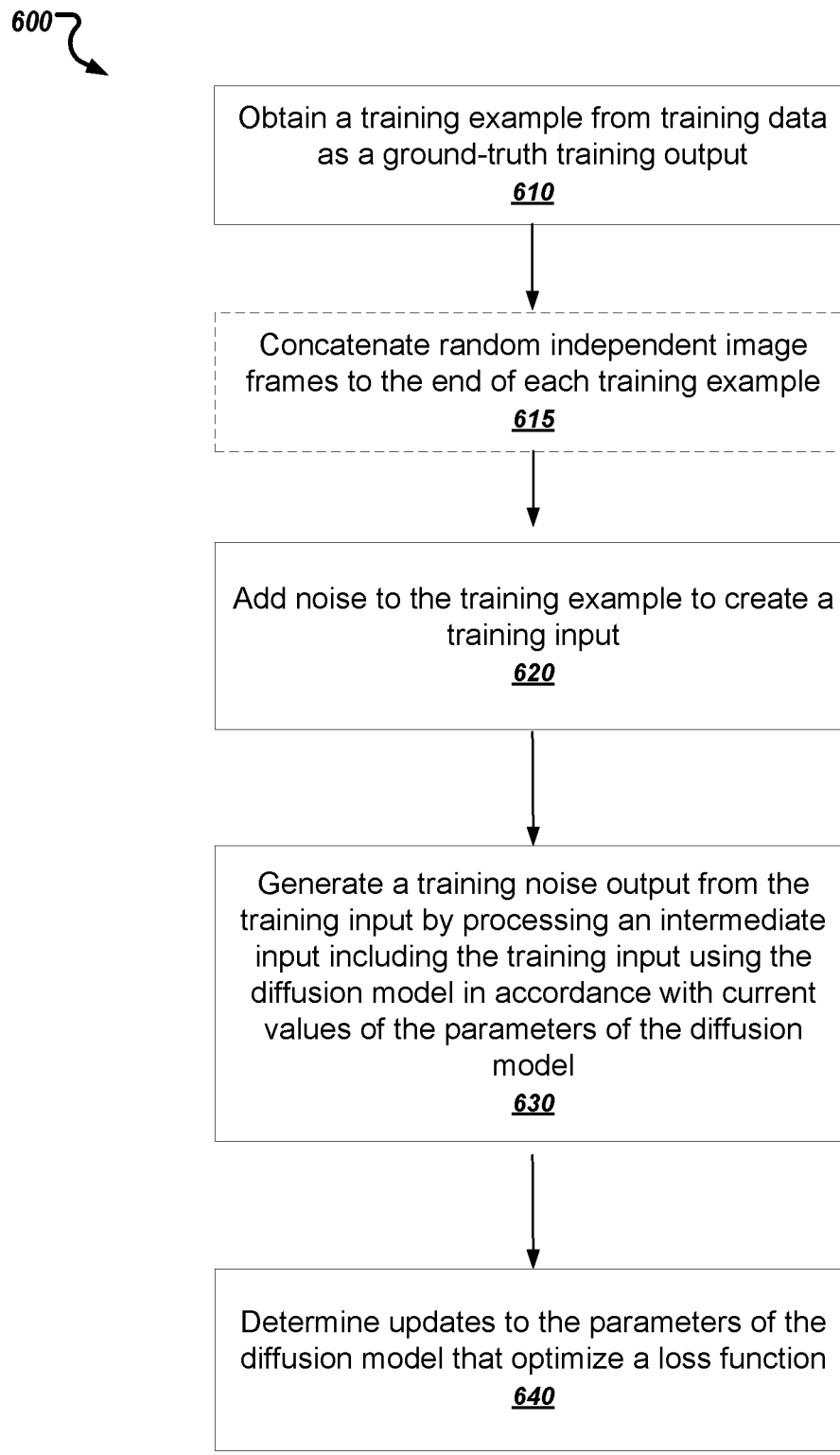
FIG. 6 is a flow diagram of an example process for training a diffusion model.

FIG. 6 is a flow diagram of an example process 600 for training a diffusion model, e.g., the diffusion model 400 of FIG. 4. For convenience, the process 600 will be described as being performed by a system of one or more computers located in one or more locations.

A training system can train a diffusion model on training data. The training system can perform the process 600 at each of multiple training iterations to repeatedly update the values of the parameters of the diffusion model so that the parameters of the diffusion model optimize a weighted mean squared error loss.

The training system can obtain a training example from training data as a ground-truth training output (step 610). For example, the training data can include videos, and the training example can be a video. For example, the training system can randomly sample training examples from a training dataset.

The training system can add noise to the training example to create a training input (step 620) as part of the forward process, described with reference to FIG. 2. For example, the training system can sample from a Gaussian noise distribution to add noise to the training example.

The training system can generate a training noise output from the training input by processing an intermediate input including the training input using the diffusion model in accordance with current values of the parameters of the diffusion model (step 630). The diffusion model can process the intermediate input to generate the training noise output as described in the process of FIG. 3.

The training system can determine updates to the parameters of the diffusion model that optimize a loss function for the training iteration (640). Learning to reverse the forward process can be reduced to learning to denoise $z_t \sim q(x)$ into an estimate or training noise output $\hat{x}_\theta(z_t, \lambda_t) \sim x$ for all t. To simplify notation, the dependence on $\lambda_t$ may be dropped throughout this specification. For example, the loss function can be a weighted mean squared error loss between the training noise output $\hat{x}_\theta(z_t, \lambda_t)$ and the ground-truth training output x:

$$\mathbb{E}_{\epsilon,t}\left[w(\lambda_r)\|\hat{x}_\theta(z_t) - x\|_2^2\right]$$

over uniformly sampled times $t \in [0,1]$.

The training system can use the $\epsilon$-prediction parametrization, defined as $\hat{x}_\theta(z_t) = (z_t - \sigma_t \epsilon_\theta(z_t))/\alpha_t$, and train $\epsilon_\theta$ using a mean squared error in $\epsilon$ space with t sampled according to a cosine schedule. This corresponds to a particular weighting $w(\lambda_t)$ for learning a scaled score estimate $\epsilon_\theta(z_t) \approx -\sigma_t \nabla_{z_t} \log p(z_t)$ where $p(z_t)$ is the true density of $z_t$ under $x \sim p(x)$.

In some implementations, the training system can use v-prediction parametrization.

In some implementations, the training system can train the model to fit a conditioning signal c. To train a diffusion model to fit p(x|c), c can be provided to the diffusion model as $\hat{x}_\theta(z_t, c)$.

In some implementations, the training system can train the model jointly on video and image generation objectives. Training the diffusion model using images increases the amount and diversity of training data available. A larger training dataset can improve the performance of the diffusion model.

In these implementations, the training system can concatenate random independent image frames to the end of each training example (step 615). In some implementations, the training system can concatenate a different number of random independent image frames to the end of each training example. For example, the training system can concatenate 4 or 8 independent image frames to a 16-frame video.

The training system can choose independent image frames from random videos within the training data. In some implementations, the training system can choose independent image frames from other datasets. For example, the other datasets can be image-only.

To train the model jointly on videos and images, the training system can mask the attention in the temporal attention blocks of the model to prevent information from mixing across video frames and the individual image frames. For example, the training system can remove the attention operation inside each time attention block and fix the attention matrix to exactly match each key and query vector at each video frame. Thus, the training system can train the model jointly on videos and images by concatenating random independent image frames to the end of each training example and masking temporal attention so that the information in the images does not influence the training of the model for video generation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method of generating an output video conditioned on an input, the method comprising:
receiving the input, wherein the input comprises a plurality of video frames that each have a respective plurality of pixels, wherein each pixel in each video frame has one or more intensity values, and wherein at least a subset of the intensity values for the pixels in the video frames are sampled from a noise distribution;
initializing a current intermediate representation based on the input;
generating an output video by updating the current intermediate representation at each of a plurality of iterations, wherein the updating comprises, at each iteration:
processing an intermediate input for the iteration comprising the current intermediate representation using a diffusion model that is configured to process the intermediate input to generate a noise output; and
updating the current intermediate representation using the noise output for the iteration, comprising:

generating a prediction of the output video using the current intermediate representation and the noise output; and for each iteration other than the last iteration:
applying a diffusion sampler to the current intermediate representation and the prediction of the output video; and
updating the current intermediate representation by applying the diffusion sampler.

2. The method of claim 1, wherein each iteration corresponds to a respective noise level, and wherein the intermediate input for the iteration further comprises the noise level for the iteration.

3. The method of claim 1, wherein applying the diffusion sampler comprises using a discrete time ancestral sampler.

4. The method of claim 1, wherein applying the diffusion sampler comprises alternating between an ancestral sampler step and a Langevin correction step.

5. The method of claim 1, wherein the input further comprises a conditioning signal and wherein the diffusion model is a conditional diffusion model that is conditioned on the conditioning signal.

6. The method of claim 5, wherein updating the current intermediate representation using the noise output for the iteration comprises generating a prediction of the output video using the current intermediate representation and the noise output, and wherein for each iteration other than the last iteration, updating the current intermediate representation using the noise output for the iteration further comprises:

applying a diffusion sampler to the current intermediate representation and the prediction of the output video, wherein applying the diffusion sampler comprises alternating between an adjusted ancestral sampler step and an adjusted Langevin correction step.

7. The method of claim 6, wherein the output video is a longer video conditioned on the video frames in the input, wherein updating the current intermediate representation using the noise output for the iteration comprises generating an adjusted prediction of the output video that is adjusted by guidance from the video frames in the input.

8. The method of claim 6, wherein the output video is a video with a higher frame rate conditioned on the video frames in the input, wherein updating the current intermediate representation using the noise output for the iteration comprises generating an adjusted prediction of the output video that is adjusted by guidance from the video frames in the input.

9. The method of claim 6, wherein the output video is a higher resolution video conditioned on the video frames in the input, wherein updating the current intermediate representation using the noise output for the iteration comprises generating an adjusted prediction of the output video that is adjusted to account for the video frames in the input.

10. The method of claim 1, wherein the diffusion model is configured to process the current intermediate representation through a sequence comprising a plurality of convolutional network blocks to generate the noise output.

11. The method of claim 10, wherein the plurality of convolutional network blocks comprise:

one or more downsampling blocks that each downsample an input to the downsampling block at each of a plurality of downsampling iterations, wherein the one or more downsampling blocks are followed in the sequence by one or more upsampling blocks that each upsample an input to the upsampling blocks at each of a plurality of upsampling iterations.

12. The method of claim 11, wherein the input to the downsampling block at a first downsampling iteration of the plurality of downsampling iterations comprises the current intermediate representation, and wherein the noise output comprises an output of the upsampling block at a last upsampling iteration of the plurality of upsampling iterations.

13. The method of claim 10, wherein the sequence further comprises network blocks that perform attention.

14. The method of claim 10, wherein each convolutional network block is configured to apply a space-only three-dimensional convolution so that a first axis indexes video frames, a second axis indexes a spatial height, and a third axis indexes a spatial width.

15. The method of claim 11, wherein at each of the plurality of upsampling iterations, the diffusion model is configured to perform operations comprising:

maintaining, for the upsampling block for the upsampling iteration, a feature map from a corresponding downsampling block;
applying a spatial attention block over the feature map to generate a spatial attention feature map;
applying a temporal attention block over the spatial attention feature map to generate a spatial temporal attention feature map; and
applying the spatial temporal attention feature map to the output of the upsampling block.

16. The method of claim 15, wherein applying a spatial attention block over the feature map to generate a spatial attention feature map comprises applying spatial attention over the values within each video frame.

17. The method of claim 15, wherein applying a temporal attention block over the spatial attention feature map to generate a spatial temporal attention feature map comprises applying temporal attention over corresponding patches across the video frames.

18. A method for training a diffusion model configured to process an intermediate input to generate a noise output, the method comprising repeatedly performing the following operations:

obtaining a training example from training data as a ground-truth training output;
adding noise to the training example to create a training input;
generating a training noise output from the training input by processing an intermediate input including the training input using the diffusion model in accordance with current values of the parameters of the diffusion model, wherein the diffusion model comprises a sequence comprising a plurality of convolutional network blocks, and wherein the plurality of convolutional network blocks comprise one or more downsampling blocks that each downsample an input to the downsampling block at each of a plurality of downsampling iterations, wherein the one or more downsampling blocks are followed in the sequence by one or more upsampling blocks that each upsample an input to the upsampling blocks at each of a plurality of upsampling iterations; and
determining updates to the parameters of the diffusion model that optimize a loss function.

19. A system comprising one or more computers and one or more storage devices storing instructions that when executed by the one or more computers cause the one or more computers to perform operations comprising:

receiving an input, wherein the input comprises a plurality of video frames that each have a respective plurality of pixels, wherein each pixel in each video frame has one or more intensity values, and wherein at least a subset of the intensity values for the pixels in the video frames are sampled from a noise distribution;

initializing a current intermediate representation based on the input;

generating an output video by updating the current intermediate representation at each of a plurality of iterations, wherein the updating comprises, at each iteration:

processing an intermediate input for the iteration comprising the current intermediate representation using a diffusion model that is configured to process the intermediate input to generate a noise output; and updating the current intermediate representation using the noise output for the iteration, comprising:

generating a prediction of the output video using the current intermediate representation and the noise output; and for each iteration other than the last iteration:

applying a diffusion sampler to the current intermediate representation and the prediction of the output video; and updating the current intermediate representation by applying the diffusion sampler.

20. One or more non-transitory computer-readable storage media storing instructions that when executed by one or more computers cause the one or more computers to perform operations comprising:

receiving an input, wherein the input comprises a plurality of video frames that each have a respective plurality of pixels, wherein each pixel in each video frame has one or more intensity values, and wherein at least a subset of the intensity values for the pixels in the video frames are sampled from a noise distribution;

initializing a current intermediate representation based on the input;

generating an output video by updating the current intermediate representation at each of a plurality of iterations, wherein the updating comprises, at each iteration:

processing an intermediate input for the iteration comprising the current intermediate representation using a diffusion model that is configured to process the intermediate input to generate a noise output; and updating the current intermediate representation using the noise output for the iteration, comprising:

generating a prediction of the output video using the current intermediate representation and the noise output; and for each iteration other than the last iteration:

applying a diffusion sampler to the current intermediate representation and the prediction of the output video; and updating the current intermediate representation by applying the diffusion sampler.

* * * * *